(12) United States Patent
Xu et al.

(10) Patent No.: US 12,202,499 B2
(45) Date of Patent: Jan. 21, 2025

(54) SYSTEM CONTROLLERS

(71) Applicant: JAGUAR LAND ROVER LIMITED, Coventry (GB)

(72) Inventors: Zhou Xu, Leamington Spa (GB); Thomas Popham, Coventry (GB); Jonathan Randall, Leamington Spa (GB); Peter Thomas, Coventry (GB); David Oxtoby, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 939 days.

(21) Appl. No.: 17/278,524

(22) PCT Filed: Jul. 5, 2019

(86) PCT No.: PCT/EP2019/068164
§ 371 (c)(1),
(2) Date: Mar. 22, 2021

(87) PCT Pub. No.: WO2020/057791
PCT Pub. Date: Mar. 26, 2020

(65) Prior Publication Data
US 2022/0032936 A1 Feb. 3, 2022

(30) Foreign Application Priority Data
Sep. 21, 2018 (GB) ...................... 1815372

(51) Int. Cl.
*B60W 50/12* (2012.01)
*B60W 40/08* (2012.01)
*B60W 50/10* (2012.01)

(52) U.S. Cl.
CPC ............ *B60W 50/12* (2013.01); *B60W 40/08* (2013.01); *B60W 50/10* (2013.01); *B60W 2540/229* (2020.02)

(58) Field of Classification Search
None
See application file for complete search history.

(56) References Cited

U.S. PATENT DOCUMENTS

| 2010/0198430 A1 | 8/2010 | Zanardelli et al. |
| 2014/0200739 A1 | 7/2014 | Kirsch |

(Continued)

FOREIGN PATENT DOCUMENTS

| DE | 102014208311 A1 | 11/2015 |
| EP | 3339126 A1 | 6/2018 |
| WO | 2017194347 A1 | 11/2017 |

OTHER PUBLICATIONS

European Office Action corresponding to European Application No. 19737092.7, dated Mar. 13, 2023, 6 pages.

(Continued)

*Primary Examiner* — Lail A Kleinman
(74) *Attorney, Agent, or Firm* — Reising Ethington P.C.

(57) ABSTRACT

There is provided a control system for controlling a system, the control system comprising one or more controllers, configured to: receive a rule configuration signal, the rule configuration signal specifying properties of a rule, the properties comprising an indicator of an action to be carried out and at least one associated trigger condition; store the indicator of the action and the at least one associated trigger condition at a storage location; determine whether the rule is to be evaluated by the control system; and if the determination indicates that the rule is to be evaluated by the control system, and upon the at least one associated trigger condition being met: generate at least one control signal in accordance with the indicated action; and output the at least one control signal to at least one vehicle system to be controlled.

10 Claims, 5 Drawing Sheets

(56) References Cited

U.S. PATENT DOCUMENTS

2015/0217777 A1     8/2015   Konigsberg
2017/0227965 A1*   8/2017   Decenzo .............. G05D 1/0094

OTHER PUBLICATIONS

International Search Report corresponding to International Application No. PCT/EP2019/068164, dated Oct. 10, 2019, 5 pages.
Written Opinion corresponding to International Application No. PCT/EP2019/068164, dated Oct. 10, 2019, 6 pages.
Combined Search and Examination Report corresponding to Great Britain Application No. GB1815372.6, dated Mar. 22, 2019, 6 pages.
Great Britain Office Action corresponding to Great Britain Application No. GB1815372.6, dated Jan. 15, 2021, 2 pages.

* cited by examiner

SYSTEM CONTROLLERS

TECHNICAL FIELD

The present disclosure relates to improvements in system controllers and particularly, but not exclusively, to a control system for a vehicle. Aspects of the invention relate to a control system, a server, a vehicle a method, computer software and a non-transitory computer readable medium.

BACKGROUND

During use of a vehicle, occupants often wish to perform secondary tasks related to control of various vehicle systems (for example, playing a particular music file through the vehicle's infotainment system, changing the temperature of components within the vehicle or adjusting the ambient lighting within the vehicle), as well as other tasks related to non-vehicle systems (for example, sending data from a mobile device associated with an occupant which may be located within the vehicle).

In many cases, the occupant will know beforehand which vehicle settings they wish to change, or which actions they would like to take under certain conditions; in some instances, the occupant may wish to carry out the same actions or tasks multiple times under similar circumstances.

Telematics services that enable communication with vehicle systems, or with other remote systems, are therefore becoming increasingly important in the vehicle industry as they enable remote monitoring, control and configuration of in-car functions. However, such services rely on the presence of a communications network to operate (e.g. the internet), and therefore automated in-car functionality can be adversely affected by losses or delays in communication.

The present invention has been devised to mitigate or overcome at least some of the above-mentioned problems.

SUMMARY OF THE INVENTION

Aspects and embodiments of the invention provide a control system, a server, a method, a vehicle, computer software and a non-transitory computer-readable medium as claimed in the appended claims.

According to an aspect of the invention there is provided a control system for a vehicle, the control system comprising one or more controllers, configured to: receive a rule configuration signal, the rule configuration signal specifying properties of a rule, the properties comprising an indicator of an action to be carried out and at least one associated trigger condition; store the indicator of the action and the at least one associated trigger condition at a storage location; determine whether the rule is to be evaluated by the control system, and upon the at least one associated trigger condition being met: generate at least one control signal in accordance with the indicated action and output the at least one control signal to at least vehicle system to be controlled.

Advantageously, providing a control system configured to store, and being capable of implementing, user-defined rules ensures that multiple and varied actions may be taken in an automated fashion as soon as the necessary conditions for the actions to occur are met. This increases the ease and efficiency with which actions may be taken. In addition, it is possible to associate multiple trigger conditions with multiple actions when defining a single rule. The overall concept is therefore one which is very flexible and easily configurable to suit a particular user's preferences.

The above-described configuration is also particularly advantageous due to provision of means to identify the evaluation location, as this enables the control system to ensure that the rule evaluation process is improved. For example, and particularly in those cases where the control system is implemented in relation to a vehicle, identification of an evaluation location may be used to determine whether evaluation is to be carried out by a control system located in-situ relative to the system to be controlled (e.g. 'on-board' the vehicle) or a control system or server located remotely from the system to be controlled (e.g. 'off-board' the vehicle). Evaluating a rule in-situ, particularly where one or more of the actions and trigger conditions may be rapidly changing over time, would decrease the latency and response times between determining that a trigger condition had been met and implementing the rule in order to take the desired action(s). This advantageously increases the overall reliability and accuracy of the system.

In embodiments, the one or more controllers collectively comprise: at least one electronic processor having an electrical input for receiving the rule configuration signal; and at least one electronic memory device operatively coupled to the at least one electronic processor and having instructions stored therein; wherein the at least one electronic processor is configured to access the at least one memory device and execute the instructions stored therein so as to store the indicator of the action and the at least one associated trigger condition; determine whether the rule is to be evaluated by the control system; generate the at least one control signal; and output the at least one control signal to at least one vehicle system to be controlled.

In some embodiments, the system to be controlled may comprise a system of a vehicle. Example vehicle systems that may be controlled in this manner include an ECU, a fuel system, an oil system, a multimedia system, and internal vehicle electronics, although many other types of vehicle system would be readily appreciable by the skilled person as being suitable for control in this manner. Additionally or alternatively, the system to be controlled may comprise a communication system, e.g. a communication system for communicating with one or more remote devices. It is advantageous to be able to automatically control various different vehicle systems using such a control system as it may decrease the likelihood of distraction of the vehicle occupant.

Additionally or alternatively, the system to be controlled comprises a remote device associated with a vehicle. For example, this could include a mobile device associated with a user of the vehicle, which device may generally be located within the vehicle during its operation but would not form part of the vehicle system per se. However, it would be appreciated that the remote device need not necessarily be associated with the vehicle at all, and could conceivably be a remote device or system that the user would like to be able to control automatically from their vehicle—for example, to control a home heating system of the user.

Optionally, the control system may be integrated within the vehicle (i.e. in an 'on-board' location), and would therefore be able to control the vehicle system in-situ. In this case, and particularly where the action(s) and/or trigger condition(s) is/are defined in relation to the vehicle, the control system will be able to monitor the trigger condition(s) and/or carry out the action(s) in a more responsive manner than if it were located remotely from the vehicle. This is because the necessary data collection required to evaluate the rule can be carried out more rapidly and at a higher sampling rate if the control system is located proximate to the data collection means (e.g. the sensors). In addition, locating the control system within the vehicle comprising the systems to be controlled avoids problems arising where network connections are poor and unreliable, and where the control system may therefore not be able to evaluate the trigger conditions or implement the rule in a timely manner.

Alternatively, the control system may be located remote from the vehicle, for example as part of a central server that collates and configures the rule data. Optionally, in some cases, two control systems may be provided; an 'on-board' control system that is integrated within the vehicle in question, and an 'off-board' control system that is located remotely from the vehicle. Each of these control systems may have stored a copy of all of the rules that have been configured—regardless of the intended evaluation location of the rules—thereby providing redundancy to the overall system.

Optionally, the indicated action may comprise one or more of: varying a vehicle velocity, varying a vehicle acceleration, outputting an alert to a user, outputting digital media content to a user, sending a data packet to a remote device, adjusting a property of the vehicle (for example, adjusting the lighting or temperature within the vehicle), and adjusting a component of the vehicle (for example, adjusting a vehicle seat setting). Furthermore, the trigger condition may comprise one or more of an environmental condition, a time of day, a date, a geographical location, a vehicle operating parameter, further input from a user, and receiving a data packet from a remote device. Many alternative types of actions and trigger conditions may be defined when configuring a rule, all of which would be readily appreciable by the skilled person. In addition, various different combinations and permutations of actions and trigger conditions may be used when defining a rule, so long as all of the properties or components comprising the resulting rule are mutually compatible.

In some embodiments, the control system may comprise a user interface configured to enable the user to select one or more rules that are not to be utilised. Alternatively or additionally, the user may use this interface to select one or more rules that are to be utilised. In other words, by virtue of the provision of the user interface, the user is able to easily activate or deactivate rules that have already been pre-defined and stored, without needing to interface with the server that was used to configure the rules initially. In other cases, the user interface may instead be provided in a mobile device of the user and the user may, for example, interact via a mobile application running on the mobile device.

In embodiments, the rule configuration signal comprises a flag corresponding to an evaluation location of the rule; and the control system is configured to determine whether the rule is to be evaluation by the control system in dependence on the flag. Additionally or alternatively, the control system is configured to determine whether the rule is to be evaluated by the control system in dependence on the action indicator and the trigger condition each having at least one associated evaluation location. In some embodiments the control system is configured to determine a location at which the rule is to be evaluated in dependence on a comparison of an evaluation location associated with the action indicator and an evaluation location associated with the trigger condition. If it is determined from the comparison that the action and trigger condition have a common evaluation location, the control system may be configured to specify that the rule is to be evaluated at the common evaluation location.

In embodiments, the rule may be user defined allowing configuration and creation of rules according to personal preferences and requirements.

According to another aspect of the present invention there is provided a server for configuring a control system according to any preceding aspect. The server is configured to: receive a configuration signal, the configuration signal specifying an action to be carried out and having at least one associated trigger condition; configure a rule having properties comprising an indicator of the specified action to be carried out and the at least one associated trigger condition; generate a rule configuration signal specifying the properties of the rule; and output the rule configuration signal to configure the control system.

In embodiments, the server comprises: at least one electronic processor having an electrical input for receiving the configuration signal; and at least one electronic memory device electrically coupled to the at least one electronic processor and having instructions stored therein; and wherein the at least one electronic processor is configured to access the at least one memory device and execute the instructions thereon so as to configure the rule, generate the rule configuration signal, and output the rule configuration signal.

In some embodiments, the server is configured to: determine a location at which the configured rule is to be evaluated and generate a flag in dependence on the determined location; and generate the rule configuration signal comprising said flag.

Advantageously, the above-described configuration allows the user to configure and create rules according to their personal preferences and requirements. The server is then able to assess these rules as they are created in order to ascertain the most appropriate evaluation location for each rule based on properties of the triggers and actions that form part of the rule. The result of this assessment is then able to be communicated to the control system (which may control the systems in accordance with the rule) via the use of a flag that is applied to and associated with the rule. The rule evaluation process is therefore optimised. For example, and particularly in those cases where the server is implemented in relation to control of a vehicle, the use of the evaluation location flag may determine whether evaluation is to occur by a control system located in-situ with the system to be controlled (e.g. 'on-board' the vehicle) or a control system and/or server located remotely (e.g. 'off-board' the vehicle). Evaluating a rule in-situ, particularly where one or more of the actions and trigger conditions varies rapidly, would decrease the latency and response times between determining that a trigger condition had been met and implementing the rule to take the desired action(s). This would therefore advantageously increase the reliability and accuracy of the system overall.

Furthermore, the provision of a central server with which the user may configure and store their defined rules, and whereby the central server also transmits the configured rules to a remotely-located control system for subsequent implementation and storage, ensures that there is a centralised location for handling of all the rules, at which properties and settings may be altered to take global effect.

Optionally, the action and the trigger condition each have at least one associated evaluation location, and the server is configured to determine a location at which the configured rule is to be evaluated by comparing the evaluation locations of the action and trigger condition. For example, each action and trigger condition may be associated with 'on-board' (in-situ) evaluation, and/or 'off-board' (remote) evaluation, depending on the data that is required to be monitored in order to fulfil each trigger condition, or the signals that need to be output to carry out the action. This ensures that the rule evaluation and implementation process may be improved.

Furthermore, in some cases, if it is determined from the comparison that the action and trigger condition have a common evaluation location, the server is configured to generate a flag specifying that the rule is to be evaluated at the common evaluation location. In this case, the processes and/or physical components involved in monitoring the trigger condition and implementing the action are mutually compatible, and the overall evaluation of the rule may therefore easily be carried out by a single entity in one location. This advantageously improves the overall efficiency of the system.

Optionally, if it is determined from the comparison that the action and trigger condition have more than one common evaluation location, and one of the common evaluation locations corresponds to an on-board vehicle location, the server is configured to generate a flag specifying that the rule is to be evaluated at the on-board vehicle location. In this instance, preference is given to 'on-board' or in-situ evaluation of the rule due to the advantages associated with that mode of evaluation. As has been previously discussed, evaluating a rule in-situ, particularly where one or more of the actions and trigger conditions is rapidly changing with time, would decrease the latency and response times between determining that a trigger condition had been met and implementing the rule to take the desired action(s). This would therefore advantageously increase the reliability and accuracy of the system as a whole.

Alternatively, if it is determined from the comparison that the action and trigger condition do not have a common evaluation location, the server may be configured to output an error message to indicate that a rule configuration signal cannot be generated. This feature is useful for error handling in order to prevent any un-executable or unworkable rules from being created in which the evaluation of the action and trigger are not mutually compatible (for example, they would need to be carried out by, or in relation to, physically separate and distinct entities). Advantageously, the user is alerted when it is determined that a rule is not configurable, and therefore the user is able to reflexively alter their preferences and re-configure the rule.

Optionally, the system to be controlled may comprise one of: a system of a vehicle, and a remote device associated with a vehicle. Alternatively or additionally, the system to be controlled may involve a remote device or system that is not associated with a vehicle per se, but rather with the user of the system (and of the vehicle). For example, a heating system of the user's home could be controlled using the above-described server and control system.

In some cases, the server may further comprise a storage location, wherein the server is configured to store the rule and the associated flag in the storage location. In this case, a copy of all of the rules and their associated flags can be stored centrally at the server, and the server may also therefore be able to function as a remote 'off-board' control system, thereby providing complementary functionality to that provided by an 'on-board' control system. Redundancy of rule storage is also achieved in this case, as the rules would therefore be stored by both the server and the control system. Furthermore, storage of the rules at a central location means that the properties (e.g. evaluation locations associated with each action and trigger) may be altered centrally and propagated accordingly at a later date (for example, by a system update) if requirements or preferences change.

It should be noted that the features of the control system and server described above, and the associated advantages in each case, would be equally applicable in respect of the following methods that are carried out by the control system and server.

According to another aspect of the present invention there is provided a method for controlling a control system of a vehicle. The method comprises: receiving a rule configuration signal, the rule configuration signal specifying properties of a rule, the properties comprising an indicator of an action to be carried out and at least one associated trigger condition. The method further comprises storing the indicator of the action and the at least one associated trigger condition at a storage location; and determining whether the rule is to be evaluated at the control system. If the determination indicates that the rule is to be evaluated by the control system, and upon the at least one associated trigger condition being met, the method further comprises generating at least one control signal in accordance with the retrieved action and outputting the at least one control signal to at least one vehicle system to be controlled in accordance with the action.

In embodiments, the properties of the rule include a flag corresponding to an evaluation location of the rule. In such embodiments, the method may comprise assessing the flag to determine whether the rule it to be evaluated at the control system. Additionally or alternatively, the method comprises determining whether the rule is to be evaluated by the control system in dependence on the action indicator and the trigger condition each having at least one associated evaluation location. In some embodiments the method comprises determining a location at which the rule is to be evaluated in dependence on a comparison of an evaluation location associated with the action indicator and an evaluation location associated with the trigger condition. If it is determined from the comparison that the action and trigger condition have a common evaluation location, the method may comprise specifying that the rule is to be evaluated at the common evaluation location.

The at least one vehicle system may comprise any one of: an ECU, a fuel system, an oil system, a multimedia system, and internal vehicle electronics. Alternatively or additionally, controlling the system comprises controlling a remote device, which may be associated with a vehicle.

In some cases, the control system may be integrated within the vehicle. Alternatively, the control system may be located remote from the vehicle. Optionally, the control system may further comprise a user interface, and the method may further comprise enabling the user to select one or more rules that are not to be utilised.

Optionally, the action may comprise one or more of: varying a vehicle velocity, varying a vehicle acceleration, outputting an alert to a user, outputting digital media content to a user, sending a data packet to a remote device, adjusting a property of the vehicle, and adjusting a component of the vehicle. Optionally, the trigger condition may comprise one or more of: an environmental condition, a time of day, a date, a geographical location, a vehicle operating parameter, further input from a user, and receiving a data packet from a remote device.

According to another aspect of the present invention there is provided a method of configuring a control system for controlling a vehicle system from a server. The method comprises: receiving a configuration signal, the configuration signal specifying an action to be carried out and at least one associated trigger condition; and configuring a rule having properties comprising an indicator of the specified action to be carried out and the at least one associated trigger condition. The method further comprises generating a rule configuration signal specifying properties of the rule; and outputting the rule configuration signal to configure the control system.

In embodiments, the method comprises determining a location at which the configured rule is to be evaluated; and generating a flag in dependence on the determined location, the flag being associated with the configured rule.

Optionally, the action and the trigger condition each have at least one associated evaluation location, and the step of determining a location at which the configured rule is to be evaluated comprises comparing the evaluation locations of the action and trigger condition.

The system to be controlled may comprise one of: a system of a vehicle, and a remote device associated with a vehicle.

In some cases, if it is determined from the comparison that the action and trigger condition have a common evaluation location, the step of generating a flag comprises generating a flag specifying that the rule is to be evaluated at the common evaluation location. Optionally, if it is determined from the comparison that the action and trigger condition have more than one common evaluation location, and one of the common evaluation locations corresponds to an on-board vehicle location, the step of generating a flag comprises generating a flag specifying that the rule is to be evaluated at the on-board vehicle location.

Optionally, if it is determined from the comparison that the action and trigger condition do not have a common evaluation location, the method further comprises outputting an error message to indicate that a rule configuration signal cannot be generated. In such cases, the flag generating and rule configuring steps would not be performed.

In some cases, the method may further comprise storing the rule and the associated flag in a storage location.

According to a further aspect of the present invention there is provided a vehicle comprising the control system, and/or the server substantially as described above.

According to another aspect of the present invention, there is provided a non-transitory computer readable medium comprising computer readable instructions that, when executed by a processor, cause performance of the method substantially as set out above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

A specific embodiment of the present invention will now be described in which numerous specific features will be discussed in detail in order to provide a thorough understanding of the inventive concept as defined in the claims. However, it will be apparent to the skilled person that the invention may be put in to effect without the specific details and that in some instances, well known methods, techniques and structures have not been described in detail in order not to obscure the invention unnecessarily.

Figure 1:
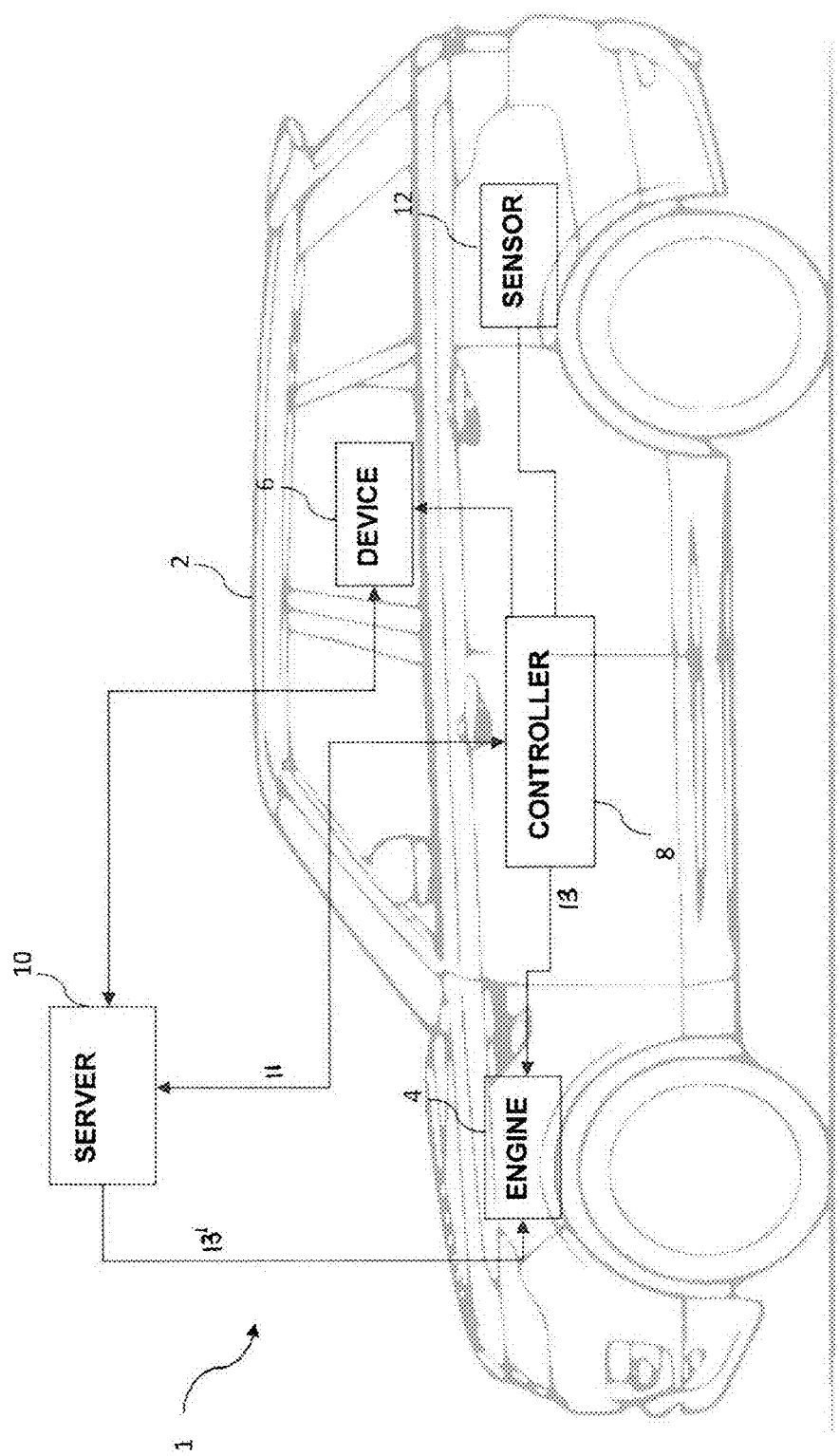
FIG. 1 illustrates an example of a distributed control system provided in respect of a vehicle for controlling one or more systems according to an embodiment of the present invention.

In order to place the embodiments of the invention in a suitable context, reference will firstly be made to FIG. 1, which illustrates a vehicle in relation to which an embodiment of the present invention may be implemented.

FIG. 1 illustrates an example of a distributed control system 1 for configuring and implementing rules relating to a vehicle 2 comprising a plurality of vehicle systems (exemplified by the engine 4) that may be controlled by a user of the vehicle. These vehicle systems include, for example, an ignition system, a satellite-navigation system, a heating and air conditioning system, a seat heating system, a stereo system, an infotainment system, a seat configuration system, various vehicle camera systems, wing mirror control systems, a tow bar control system and a driving mode selection system, among others. It will be appreciated that these systems are merely illustrative, and that different vehicles may comprise different systems. The system 1 may also comprise one or more non-vehicle systems (exemplified by the device 6), which may take the form of, for example, the user's mobile device. The system 1 comprises at least one controller 8 located within the vehicle 2 (thereby providing 'on-board' control functionality), and at least one server 10 located remote from the vehicle 2 (thereby providing 'off-board' control functionality). The controller 8 and server 10 are in operative communication with one another, and together are configured to control the plurality of vehicle and non-vehicle systems 4, 6. The system 1 also comprises one or more sensors 12 which are configured to provide data to the controller 8 and/or the server 10 for use in the evaluation and implementation of rules for controlling the various systems.

Figure 2:
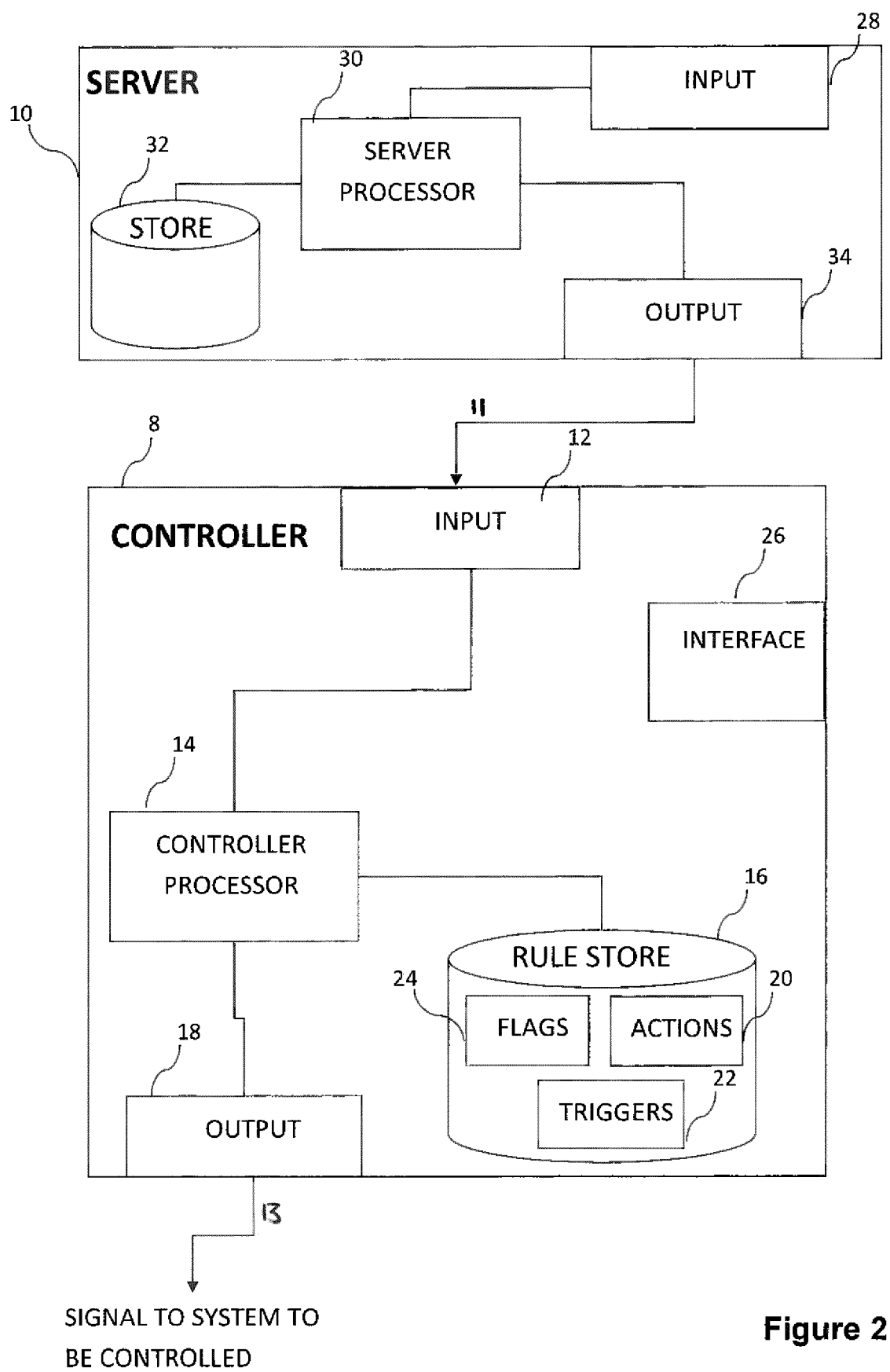
FIG. 2 is a schematic block diagram illustrating further details of an example of a controller and server that form part of the distributed control system of FIG. 1.

Further details of the controller 8 and the server 10 are shown in FIG. 2. Specifically, the controller 8 comprises an input 12 for receiving rule configuration signals 11; a (controller) processor 14 with an associated data store 16 for processing and storing data relating to rules that are to be implemented for controlling the vehicle 4 and non-vehicle 6 systems; and an output 18 for outputting control signals 13 to the systems 4, 6 to implement the rules. The rule store 16 is configured to store aspects or properties of the rules that are to be implemented—namely, one or more task or action indicators 20 for tasks and/or actions that are to be undertaken and carried out if the rule is implemented; one or more trigger conditions 22 that are required to be met for the rule to be implemented; as well as a flag 24 that indicates an intended evaluation location of the rule, and therefore determines whether a particular rule is to be implemented by the controller 8. The controller 8 also comprises an interface 26 via which a user may interact with the controller 8 if so desired.

The server 10 also comprises an input 28 for receiving signals, and a (server) processor 30 with an associated data store 32 for processing and storing data relating to rules that are to be implemented. The server 10 further comprises an output 34 for outputting rule configuration signals 11 to the controller 8 for controlling the various systems 4, 6. In some cases, the server 10 may also provide control functionality for some of the systems 4, 6. In such cases, the server also functions as an 'off-board controller' (whereas the controller 8 functions as an 'on-board controller') and control signals 13' may therefore be generated and output directly to the systems 4, 6 by the server 10 itself. Alternatively, it is envisioned that the server 10 could be in communication with an additional controller for generating control signals 13' for the systems 4, 6 that is located within the same network, and that is therefore also located remotely 'off-board' from the vehicle 2.

In use, the server 10 is configured to receive information via the input 28 from a user relating to a task that the user desires to be carried out by one or more of a plurality of vehicle 4 and non-vehicle systems 6. In particular, the server 10 is configured to receive from the user one or more action indicators 20 along with one or more associated trigger conditions 22, and to assess the received information using the processor 30 and associated data store 32, in order to configure a rule corresponding to the received action indicator(s) 20 and trigger condition(s) 22. This configured rule will be evaluated at a later time (by the controller 8 or the server 10), during which evaluation if the trigger conditions are met, the desired action will be carried out. As part of the assessment process, the server 10 is configured to determine a preferred location at which the rule should be evaluated and to generate a flag 24, representing this evaluation location, which is associated with the rule. The server 10 is then configured to generate a rule configuration signal 11 for provision to the controller 8, which comprises the rule (i.e. the action indicator(s) 20 and trigger condition(s) 22) as well as the location flag 24. This rule configuration signal 11 is output to the controller 8 by the server 10.

In addition, the configured rule (together with its associated flag 24) is stored by the server 10 in the data store 32—it will subsequently be retrieved, evaluated and implemented by the server 10 if the flag indicates that the rule is intended to be evaluated remotely 'off-board' from the vehicle 2. Additionally/alternatively, where a separate 'off-board' controller is utilised, the configured rule is transmitted to and stored by that controller (not shown).

The on-board controller 8 is configured to receive the rule configuration signal 11 from the server 10, and to store the information received—namely, the action indicator(s) 20, trigger condition(s) 22 and the associated flag 24—in the rule store 16. The controller 8 is also configured to assess the flag 24 in order to ascertain whether the rule is intended to be evaluated by the controller 8 itself. Where it is determined that the rule is to be evaluated 'on-board' by the controller 8, the controller 8 is configured to monitor the associated trigger conditions and, in the event that the trigger conditions for the rule are met, the controller 8 is configured to generate a control signal 13 for output to the requisite system 4, 6 in order to cause that system (or one of its components) to take the appropriate action(s) defined by the rule. Where it is determined that a rule is to be evaluated 'off-board' by the server 10, the controller 8 merely stores the rule in its rule store 16 but does not take any further action relating to that rule.

Providing a distributed system involving a pair of controllers—an 'on-board' controller 8 and an 'off-board' controller/server 10—which each store all of the configured rules but only evaluate and implement certain pre-determined rules, provides certain advantages. In particular, this setup reduces the required communication bandwidth and communication times (compared to a system that only involves a remote 'off-board' controller), and hence the latency, associated with evaluating the rules, determining that a trigger condition has been met, and subsequently carrying out the requisite actions. In addition, this setup also improves the reliability of the overall system, as provision of the on-board controller ensures that rules may still be evaluated and implemented even if the vehicle has no access to a communications network and therefore cannot communicate with the off-board controller or server 10.

Figure 3:
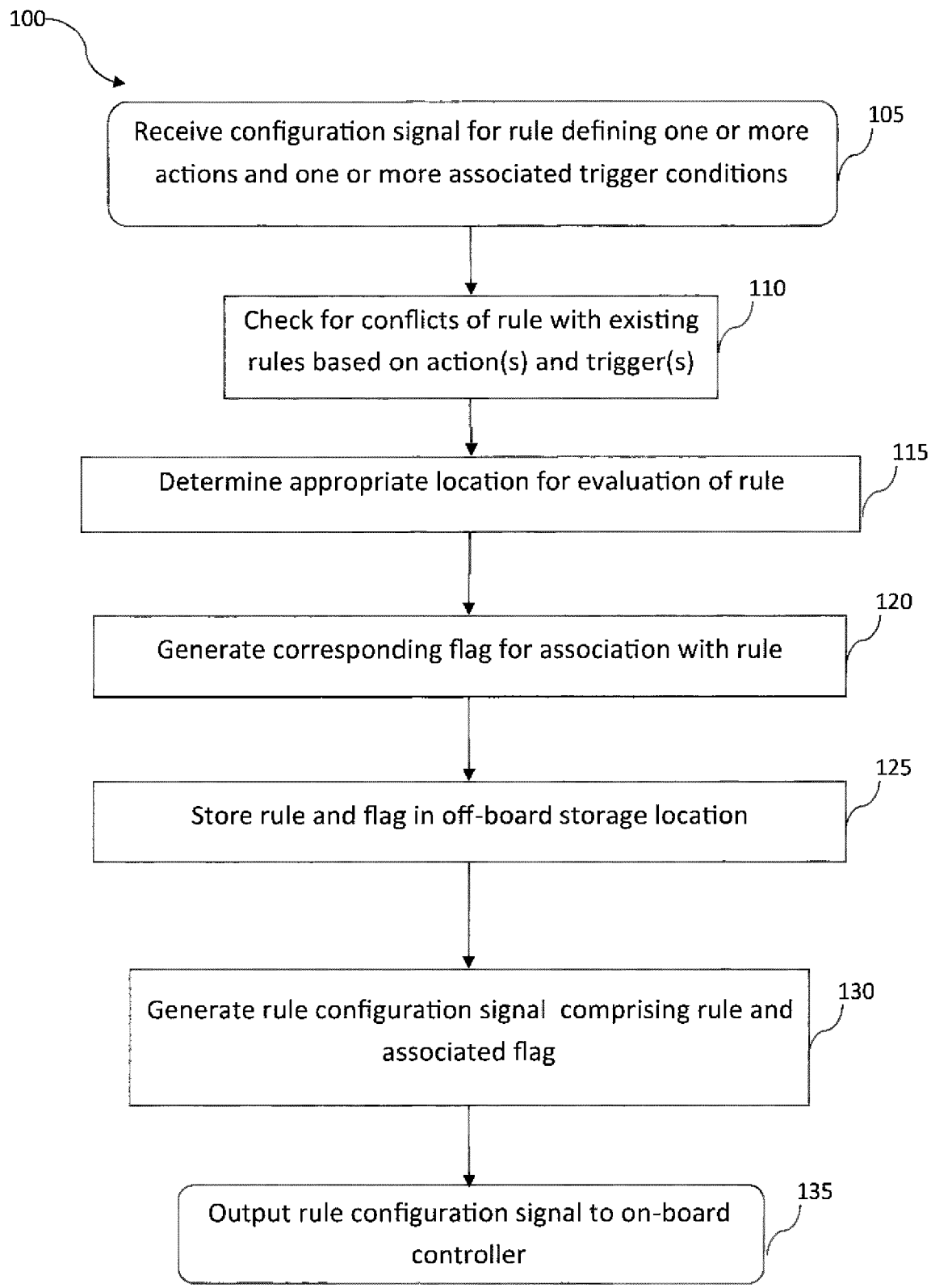
FIG. 3 is a flow chart illustrating an example of a method of defining rules and providing a rule configuration signal to a controller according an embodiment of the present invention.

FIG. 3 illustrates a method by which rules are created and configured using the server 10, and subsequently output to the controller 8.

The process 100 begins with the user configuring and creating one or more rules that they would like to implement. This requires information input in step 105 by the user to the server 10, for example, via input of data by the user to a dedicated application on their mobile device; this data input is forwarded in the form of a rule configuration signal 11 to the server 10, which may, for example, take the form of a Cloud server. As part of this initial step, the user may also create a profile or account in their application and link one or more of their vehicles to the profile—this would only usually be carried out when the user first sets up an account on the application, or if they wish to implement the rules on additional or alternative vehicles.

Creating a rule requires the entry or selection by the user of one or more action indicators 20 that are to be carried out when the rule is implemented, as well as one or more associated conditions (i.e. triggers 22 or events) that will be monitored and assessed to determine when the rule is to be implemented and the action is to be taken. In other words, the rule may correspond to a logic statement defining that if a set of one or more trigger conditions are met, then the set of one or more associated actions will be taken.

Once the rule configuration signal 11 is received by the server 10, it carries out checks in step 110 to ensure that the newly-configured rule is not a replica of an existing rule that was previously stored by the server 10, and also that the newly-configured rule does not conflict with any existing stored rules. Such conflicts would arise where the trigger conditions selected by the user are intended to trigger the same type of action as an existing rule but with different (conflicting) settings. As an example, if two rules are defined relating to setting the ambient lighting colour within the vehicle 2, and the same trigger conditions are selected but the ambient colour that is required to be output as a result is different in each case, then the two rules will be in conflict with one another. In such a case, the server 10 may output an error to the user and not accept or store the newly-configured rule. Alternatively, the server 10 may simply overwrite or replace the existing rule with the new rule, and may output an indication to the user that the old rule has been overwritten/replaced. Exceptions to this rule conflict check are allowed for actions involving messaging functionality—for example, it would be possible for the same conditions to trigger the output of messages having different content or different intended recipients.

Once these checks have been performed, and the rule has been deemed to be valid and acceptable, the server 10 is configured to determine in step 115 an appropriate location where the rule should be evaluated—namely, by the controller 8 'on-board' the vehicle 2, or by the server 10 'off-board' the vehicle 2. As a result of this determination, the server 10 is also configured to generate in step 120 a flag 24 indicating the intended rule evaluation location, and to associate this flag with the rule.

The process of determining the rule evaluation location is useful because, in cases where trigger condition(s) for a particular rule rely solely on vehicle data, and where the actions to be taken only target the vehicle functions, it is advantageous to ensure that such rules are evaluated 'on-board' the vehicle. This is due to a decrease in response time and latency (resulting from an increased sampling rate ability by the on-board controller 8), as well as a decrease in the overall data bandwidth required to monitor and evaluate such rules on-board and in-situ.

In order to carry out the determining process of step 115, the server 10 may maintain a list or database 32 of all possible trigger conditions 22 and actions 20 that may be used when creating a rule. Every trigger condition and action may be associated with, or may be assigned, one or more location attributes which identify whether the trigger condition or action is suitable to be evaluated on-board or off-board the vehicle. Each trigger condition and action may therefore be assigned one of the following location evaluation attributes: 'on-board only', 'off-board only', and 'on/off-board'.

For example, trigger conditions that require the monitoring of vehicle-specific properties (such as vehicle speed, vehicle temperature or vehicle drive mode) are defined to be 'on-board only' trigger conditions; similarly, actions that require changing vehicle properties (such as the vehicle drive mode, the ambient temperature or lighting, or the media displayed in the vehicle) will also be defined as 'on-board only' actions. Conversely, trigger conditions or actions that are only relevant when the vehicle is not operational and/or when the user is not in the vehicle (such as triggering the vehicle lock, or actioning a remote engine start prompt) will be designated as 'off-board only', since they would not be carried out except when the vehicle 2 is not in active use. Finally, there are multiple trigger conditions and actions which are not necessarily dependent upon vehicle-specific properties that change rapidly as a result of or during vehicle operation (such as, the date/time, vehicle location, as well as information about the oil or brake fluid level). These trigger conditions and actions may be evaluated at either location, and therefore are designated as being suitable for 'On/off-board' evaluation.

Figure 4:
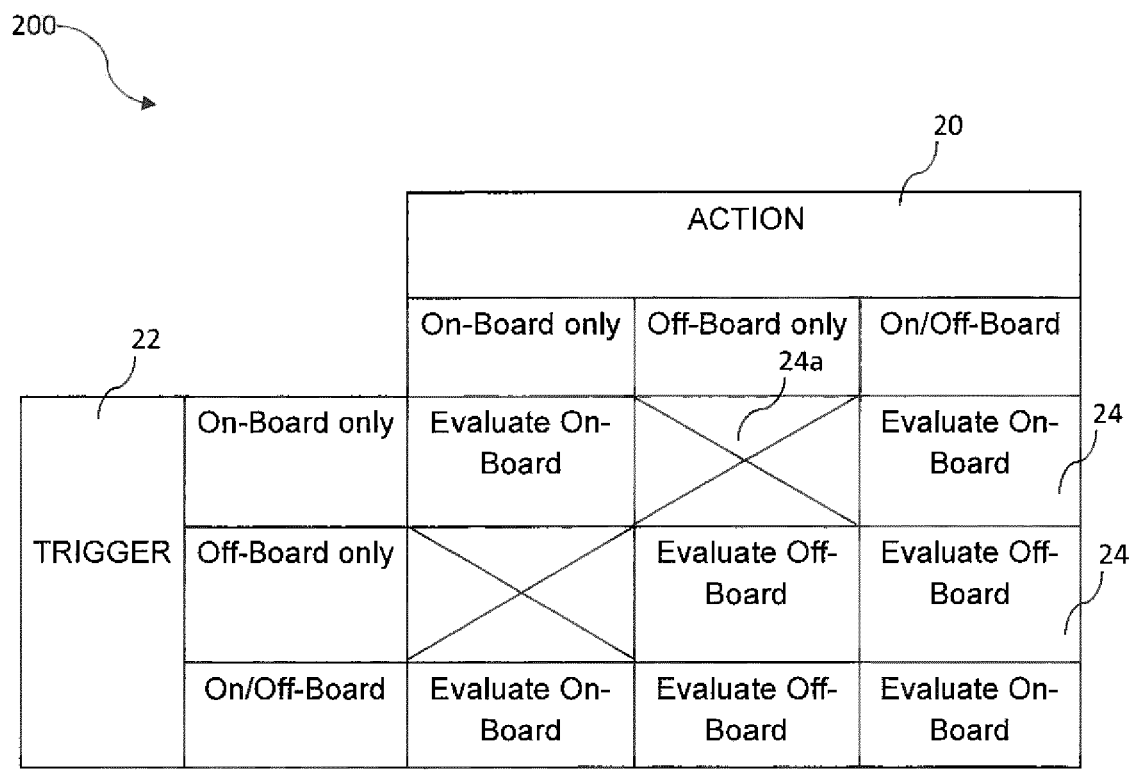
FIG. 4 is a table illustrating an example of logic that may be applied to determine an evaluation location of the various trigger conditions and actions associated with a rule defined according to FIG. 3.

Based on the designations of the trigger conditions and actions that are associated with a specific rule, the server is able to determine the appropriate evaluation location for the rule using a decisioning process and logic that is illustrated in the table 200 in FIG. 4. As may be seen from that figure, if one of the trigger conditions 22 or actions 20 requires a specific evaluation location (i.e. is designated to be 'on-board only' or 'off-board only') then the appropriate flag 24 will be generated to reflect this fact. However, if there is a conflict between desired evaluation locations (for example, if a trigger condition is designated as 'on-board only' but an action is designated as 'off-board only'—indicated in the table 200 by a cross 24a), then the server will not complete configuration of the rule, and will output an error to the user to indicate that the properties of the rule are not compatible with one another. If all of the trigger conditions and actions are designated as being capable of evaluation in both on-board and off-board situations, preference will be given to on-board evaluation since this mode of evaluation will generally be quicker and more efficient because there would be no need to transmit real-time information relating to the trigger conditions to the off-board server 10.

Once the rule has been generated and the associated flag 24 has been created, the server 10 will store in step 125 the rule and flag at a storage location off-board and remote from the vehicle 2 (e.g. in data store 32). The server 10 will also generate in step 130 a rule configuration signal 11 comprising the rule and the associated flag, and will transmit in step 135 the rule configuration signal 11 to the on-board controller 8. It will therefore be appreciated that the rule and flag created by the server 10 will be stored in two locations—an on-board and an off-board location—regardless of where the rule is eventually intended to be evaluated. The rules will therefore be synchronised between the two locations.

Although the server 10 is described herein as being configured to determine appropriate location where the rule should be evaluated, it will be appreciated that this determination could equally be made by the controller 8. For example, the controller 8 may be configured to determine whether the rule should be evaluated by the controller 8 'on-board' the vehicle 2, or by the server 10 'off-board' the vehicle 2. In embodiments, as a result of this determination, the controller 8 may also configured to generate a flag 24 indicating the intended rule evaluation location, and to associate this flag with the rule.

Figure 5:
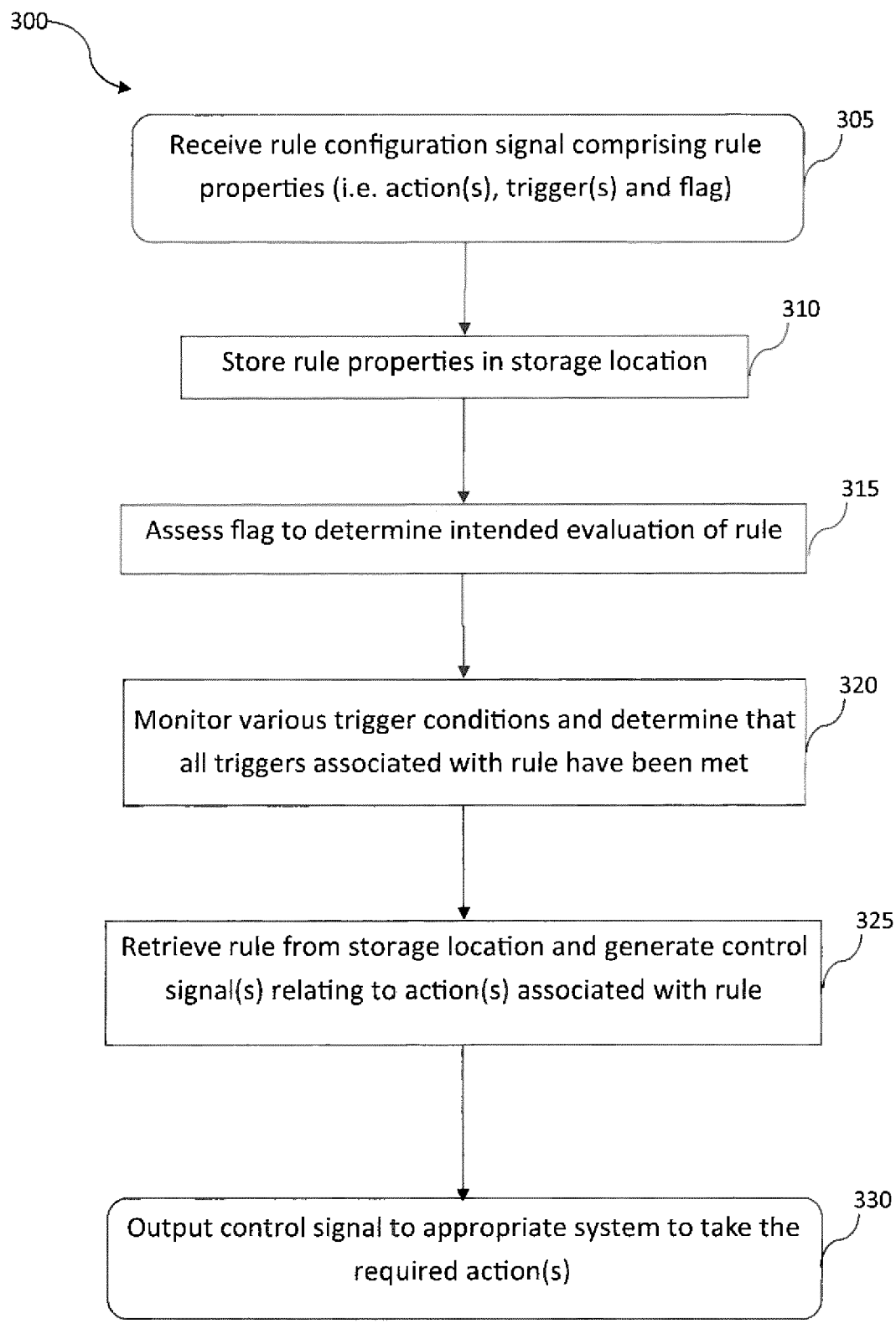
FIG. 5 is a flow chart illustrating an example of a method of controlling a system based on evaluation of user-defined rules by a controller according to an embodiment of the present invention.

FIG. 5 illustrates a process 300 by which the controller 8 processes and handles the information received from the server 10. The process 300 begins at step 305 in which the on-board controller 8 receives the rule configuration signal 11 transmitted from the server 10 which comprises the corresponding trigger(s) 22, action(s) 20 and evaluation location flag 24. This information (which effectively corresponds to properties of the rule in question) is stored at step 310 in a storage location (for example, the data store 16) by the on-board controller 8. The controller 8 is also configured to assess at step 315 the flag 24 associated with the received rule in order to determine whether the rule is intended to be evaluated on-board the vehicle 2 by the controller 8. Subsequently, for those rules that are designated for on-board evaluation, the controller 8 is configured to monitor or to periodically assess at step 320 whether the various trigger conditions associated with these rules have been met. For example, this monitoring or assessment may involve receiving information from the one or more sensors 12 relating to the vehicle properties. Once it is determined that all of the trigger conditions for a particular rule have been met, the controller 8 is configured to retrieve the associated action(s) from the storage location 16 and to generate at step 325 one or more control signals 13 in relation to these action(s). The control signals 13 are then output in step 330 to the appropriate systems (which may be either vehicle systems 4 or non-vehicle systems 6, or a combination of the two) to cause those system to take the necessary actions.

As an example, a rule may be configured to specify that "on a weekday, if the vehicle leaves a specific location (i.e. the work car park) within a particular time range, this should trigger the mobile device linked to the vehicle system to send a text message/notification to a particular recipient and having a specific content". In this example, the trigger conditions involved are (a) the location of the vehicle, and (b) the date and time; whilst the action involved is the generation and transmission of a text message/notification by the user's mobile device. Of these, the date and time trigger conditions are clearly vehicle-independent, as is the action (since it does not relate directly to altering vehicle functionality). Furthermore, whilst the vehicle location is of course vehicle-dependent, it could potentially still be evaluated 'off-board', as the rate of change of the vehicle location will not be excessively high (particularly in this case where the trigger condition relies on a simple determination as to whether the vehicle 2 is no longer stationary and has left a particularly location). Therefore, in the case of this particular rule, the trigger conditions and the action would all be designated as 'on/off-board', since their evaluation location would not be critical to the response latency time. However, as was described previously, preference will still be given to 'on-board' evaluation, particularly as it would generally be more effective to monitor the vehicle location on-board the vehicle—the GPS location of the vehicle may be monitored at a much higher frequency by an on-board controller than an off-board controller/server (for example, the on-board update frequency would only be around a few seconds, but an off-board update frequency would be much longer, around a minute or so). It would also be more efficient in this instance to control the action from on-board the vehicle since the mobile device in question would be linked to the vehicle, and could be controlled directly 'in-car'. Therefore, in this example, the controller 8 will monitor the trigger conditions, and when they have been met, the controller 8 will generate and send a control signal 13 to the user's mobile device 6 (either via a dedicated application, or through an in-car connection) to generate and send the text message/notification.

Although only a small number of different trigger conditions and actions have been described herein, it will be appreciated that many others are/would be available to the user and can be combined as required in order to define a myriad of different rules, provided the resulting rules do not comprise any conflicting combinations of trigger conditions and/or actions. It is submitted that the skilled person would understand the possible combinations and permutations available given the normal functions of vehicle and associated non-vehicle systems currently available.

It is noted that the user may also interact with the overall distributed system 1 subsequent to the initial rule configuration process. For example, the user may interact with the controller 8 or server 10 (either via a user interface 26 to the controller 8, such as a touchscreen within their vehicle 2, or via an application on their mobile device 6 that is linked to the controller 8 or server 10) in order to enable or disable certain rules, and therefore activate or deactivate specific previously-defined actions according to their personal preference and changing requirements. However, the system 1 is configured to limit the user's interaction abilities in this respect—specifically, the user is not able to edit or delete rules that have previously been created, nor is the user able to create additional rules.

In alternative embodiments, the controller 8 may receive the rule configuration signal 11 from a remote device, e.g. the user's mobile device 6 and not from the server 10. In such embodiments, the controller 8 may be configured to forward or output the rule configuration signal 11 to the server 10.

Embodiments of the present invention as described above therefore provide a distributed system for configuring, evaluating and implementing user-defined rules in relation to their vehicle, in which evaluation of the rules may be performed on-board the vehicle in question, as an alternative, or in addition, to off-board or remote evaluation. This advantageously increases the effectiveness and efficiency of the overall system—use of an on-board controller reduces the latency in response times between monitoring of trigger conditions and determining that that an action may be carried out all of the trigger conditions required to undertake that action have been fulfilled. Additionally, even if connection between the remote server and the vehicle systems is lost (for example, in remote locations with poor communications networks), many rules relating to these vehicle systems will still be able to be evaluated and implemented. This advantageously increases the reliability of the overall system. Maintaining synchronised rule data in two locations simultaneously also increases the reliability of the system, and enables properties of the rules (i.e. the triggers, actions and flags) to be updated centrally at a later date, for example if system requirements change, and then re-disseminated to the vehicle's on-board controller.

Many modifications may be made to the above examples without departing from the scope of the present invention as defined in the accompanying claims.

The invention claimed is:

1. A control system for a vehicle, the control system comprising one or more controllers, configured to:
   receive a rule configuration signal, the rule configuration signal specifying properties of a rule, the properties comprising an indicator of an action to be carried out and at least one associated trigger condition;
   store the indicator of the action and the at least one associated trigger condition at a storage location;
   determine whether the rule is to be evaluated by the control system, wherein determining whether the rule is to be evaluated by the control system comprises identifying an evaluation location, in dependence on the rule configuration signal, to determine whether evaluation is to be carried out on-board the vehicle or off-board the vehicle; and
   when the determination indicates that the rule is to be evaluated by the control system, and upon the at least one associated trigger condition being met:
   generate at least one control signal in accordance with the indicated action; and
   output the at least one control signal to at least one vehicle system to be controlled.

2. The control system of claim 1, wherein the rule may be user defined allowing configuration and creation of rules according to personal preferences and requirements.

3. The control system of claim 1, wherein the control system is configured to output the at least one control signal to at least one remote device associated with a vehicle.

4. The control system of claim 1, wherein the rule configuration signal comprises a flag corresponding to the evaluation location of the rule; and the control system is configured to determine whether the rule is to be evaluated by the control system in dependence on the flag.

5. The control system of claim 1, wherein the control system is configured to determine whether the rule is to be evaluated by the control system in dependence on the action indicator and the trigger condition each having at least one associated evaluation location.

6. The control system of claim 5, wherein the control system is configured to determine a location at which the rule is to be evaluated in dependence on a comparison of an evaluation location associated with the action indicator and an evaluation location associated with the trigger condition.

7. A server for configuring a control system for a vehicle that is configured to:
- receive a rule configuration signal, the rule configuration signal specifying properties of a rule, the properties comprising an indicator of an action to be carried out and at least one associated trigger condition;
- store the indicator of the action and the at least one associated trigger condition at a storage location;
- determine whether the rule is to be evaluated by the control system, wherein determining whether the rule is to be evaluated by the control system comprises identifying an evaluation location, in dependence on the rule configuration signal, to determine whether evaluation is to be carried out on-board the vehicle or off-board the vehicle; and
- when the determination indicates that the rule is to be evaluated by the control system, and upon the at least one associated trigger condition being met:
  - generate at least one control signal in accordance with the indicated action; and
  - output the at least one control signal to at least one vehicle system to be controlled the server configured to:
- receive a configuration signal, the configuration signal specifying an action to be carried out and having at least one associated trigger condition;
- configure a rule having properties comprising an indicator of the specified action to be carried out and the at least one associated trigger condition;
- generate a rule configuration signal specifying the properties of the rule; and
- output the rule configuration signal to configure the control system.

8. A method for controlling a control system of a vehicle, the method comprising:
- receiving a rule configuration signal at the control system, the rule configuration signal specifying properties of a rule, the properties comprising an indicator of an action to be carried out and at least one associated trigger condition;
- storing the indicator of the action and the at least one associated trigger condition at a storage location;
- determining whether the rule is to be evaluated at the control system, wherein determining whether the rule is to be evaluated by the control system comprises identifying an evaluation location, in dependence on the rule configuration signal, to determine whether evaluation is to be carried out on-board the vehicle or off-board the vehicle; and
- when the determination indicates that the rule is to be evaluated by the control system, and upon the at least one associated trigger condition being met:
  - generating at least one control signal in accordance with the retrieved action; and
  - outputting the at least one control signal to at least one vehicle system to be controlled.

9. A vehicle comprising the control system of claim 1.

10. A non-transitory computer readable medium comprising computer readable instructions that, when executed by a processor, cause performance of the method of claim 8.

* * * * *